United States Patent
Sanderson et al.

(10) Patent No.: US 6,557,702 B1
(45) Date of Patent: *May 6, 2003

(54) GOLF CLUB TRAVEL BAG

(75) Inventors: David B. Sanderson, Villa Park, CA (US); Teyrrie R. Garcia, Orange, CA (US)

(73) Assignee: SKB Corporation, Orange, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/000,048

(22) Filed: Oct. 31, 2001

(51) Int. Cl.[7] .................. A63B 55/08; A63B 57/00; A63B 55/00
(52) U.S. Cl. .............. 206/315.4; 206/315.5; 206/315.8; 150/159; 190/18 A; 190/127
(58) Field of Search ............. 206/315.3–315.8; 190/125, 127, 18 A; 150/159

(56) References Cited

U.S. PATENT DOCUMENTS

| | | | | |
|---|---|---|---|---|
| 4,657,135 A | * | 4/1987 | Kjose ................. | 206/315.3 |
| 4,951,818 A | | 8/1990 | Johnson | |
| 5,010,988 A | * | 4/1991 | Brown .................. | 190/127 X |
| 5,065,847 A | * | 11/1991 | Hsieh .................. | 190/125 |
| 5,117,952 A | * | 6/1992 | Suh .................. | 190/127 |
| 5,297,328 A | * | 3/1994 | Reimers et al. ...... | 206/315.5 X |
| 5,402,883 A | * | 4/1995 | Shin .................. | 206/315.3 |
| 5,515,897 A | | 5/1996 | Fehan | |
| D398,149 S | | 9/1998 | Sanderson et al. | |
| 5,810,064 A | | 9/1998 | Sanderson et al. | |
| 5,927,361 A | | 7/1999 | Sanderson et al. | |
| 5,960,952 A | * | 10/1999 | Chen ................. | 190/125 X |
| 5,975,170 A | * | 11/1999 | Anguiano ............ | 150/159 |
| 6,161,698 A | * | 12/2000 | Bradshaw et al. ... | 206/315.4 X |
| 6,164,425 A | * | 12/2000 | Latshaw .............. | 190/18 A |
| 6,330,944 B1 | * | 12/2001 | Demichele .......... | 206/315.3 |
| 6,401,890 B1 | * | 6/2002 | Tan .................. | 190/127 X |

FOREIGN PATENT DOCUMENTS

| | | |
|---|---|---|
| JP | 58-14244 | 1/1983 |
| JP | 63-8067 | 1/1988 |
| JP | 3006541 | 11/1994 |

OTHER PUBLICATIONS

Internet Advertisement—Club Glove Travel Bags—Club Glove Last Bag Golf Travel Bag; Club Glove Last Bag XXL Golf Travel Bag; Club Glove Burst Proof Golf Travel Bag—2 pages—Undated.

(List continued on next page.)

*Primary Examiner*—Sue A. Weaver
(74) *Attorney, Agent, or Firm*—Orrick, Herrington & Sutcliffe, LLP

(57) ABSTRACT

There is disclosed herein a travel bag for containing a golf bag and clubs therein formed of a fabric and rigid panel laminated structure. The travel bag includes a bottom having a rigid cap with one or more wheels for allowing the case to be rolled via the wheels. It includes a front side having first and second zipper covers for opening and providing access to internal respective shoe and clothing compartments. The front side has a further zipper closure for allowing the entire front section of the bag to be opened to gain access to the golf bag and clubs compartment. The top includes a handle, and the left side and bottom have laminated therein and L-shaped rigid panel to facilitate movement of the travel case in the fashion of a hand truck. The back, right and top sides have laminated therein rigid panels for providing, along with the L-shaped panel, protection for golf clubs stored within the bag.

13 Claims, 5 Drawing Sheets

OTHER PUBLICATIONS

Internet Advertisement—Club Glove Last Bag Golf Travel Bag; Club glove Last Bag XXL Golf Travel Bat; Club Glove Last Bag XXL; Club Glove Last Bag—4 pages—undated.

Internet Advertisement—West Coast Trends—Makers of the Original Club Glove—1 page—undated.

Internet Advertisement—Golfstore & Ladies Golf Clubs—Last Bag by Club Glove—2 pages—undated.

Internet Advertisement—Golfstore & Ladies Golf Clubs—Golf Travel Cases (with or without wheels)—1 page—undated.

Internet Advertisement—Golfstore & Ladies Golf Clubs—Golf Bag Trvel Covers—2 pages/undated.

Internet Advertisement—Golfstore & Ladies Golf Clubs—10" Deluxe Padded Travel Bag Cover—2 pages—undated.

Internet Advertisement—Golfstore & Ladies Golf Clubs—The Straight Jacket by OGIO—Golf Travel Cover—2 pages—undated.

Internet Advertisement—The Club Glove—The Ultimate in Travel Bag Sets—1 page—undated.

Advertisement from Golfsmith Catalog—1 page (p. 35)—undated.

* cited by examiner

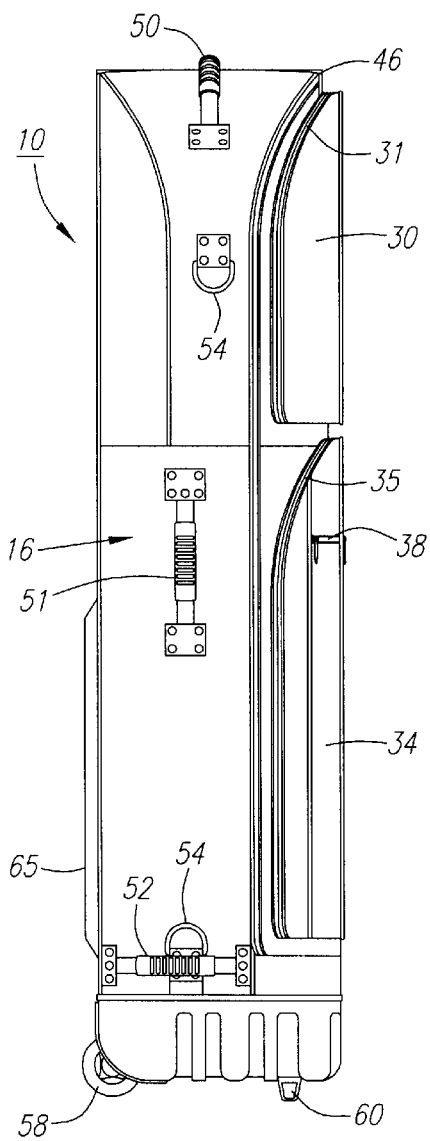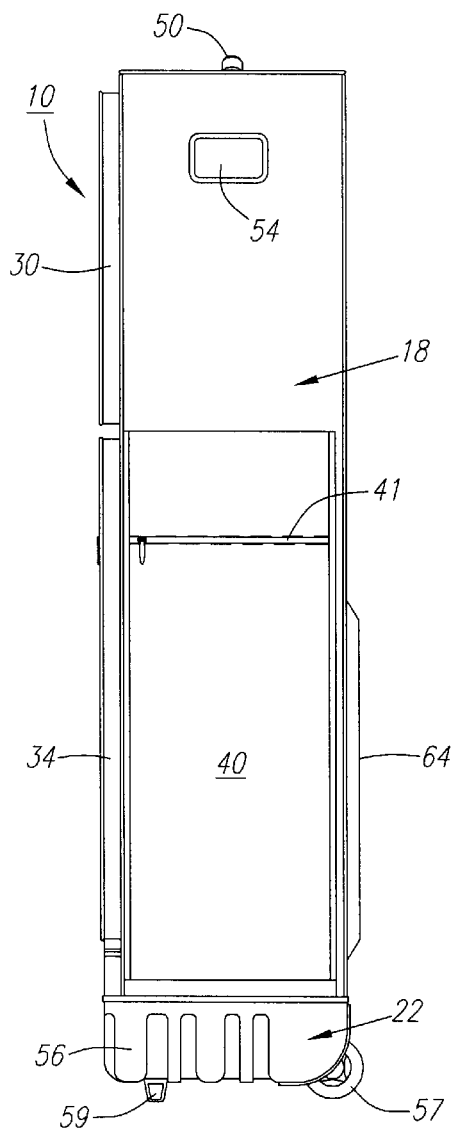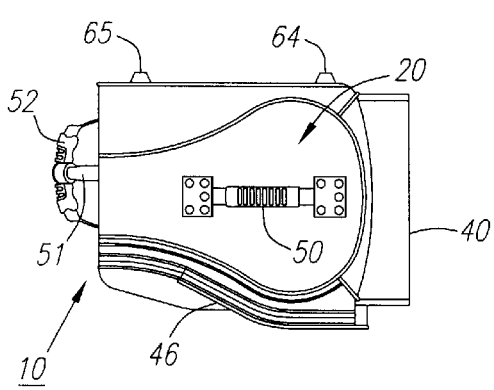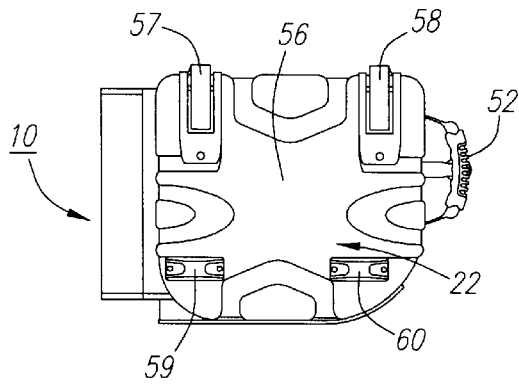

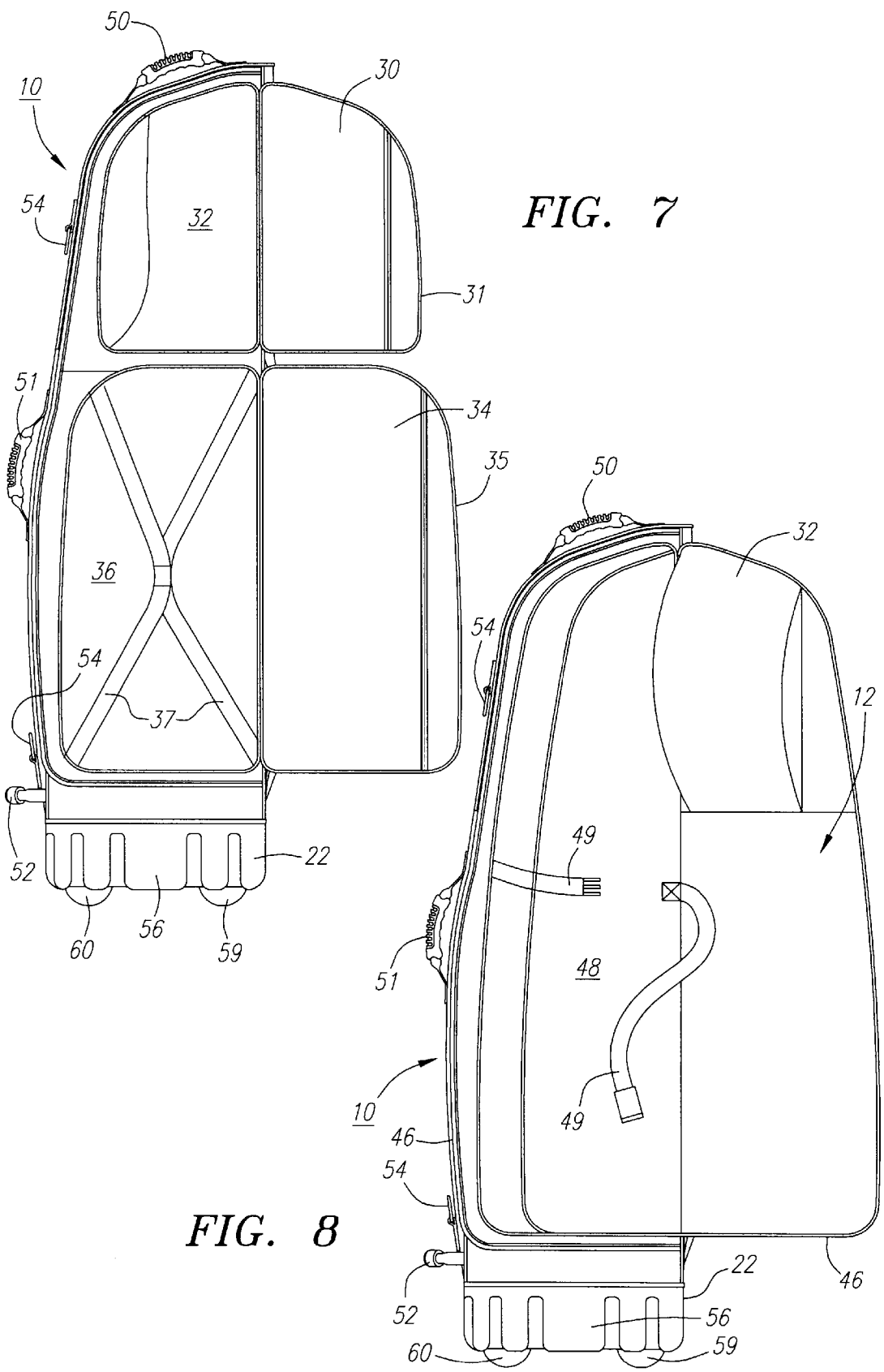

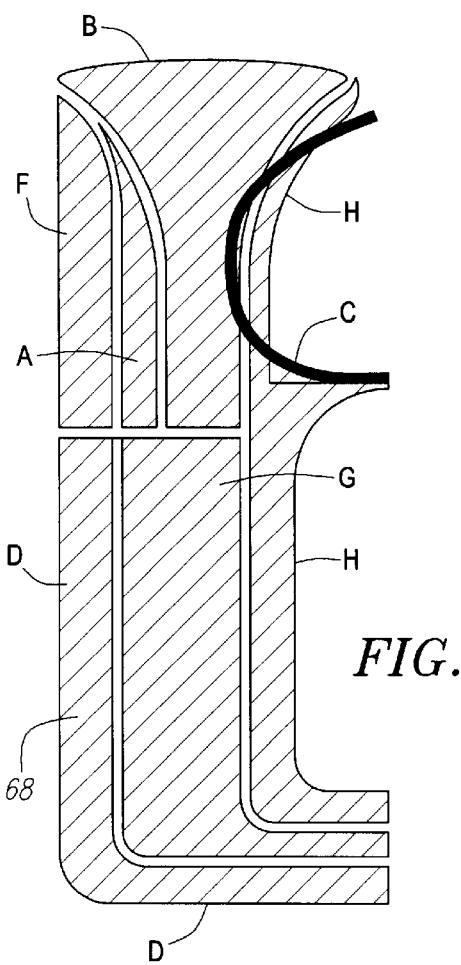
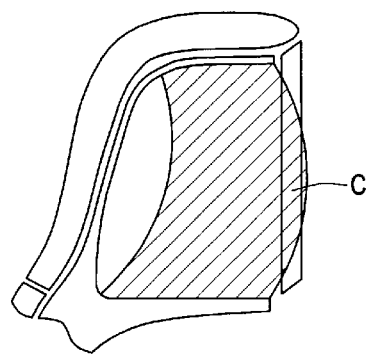
FIG. 12
FIG. 11
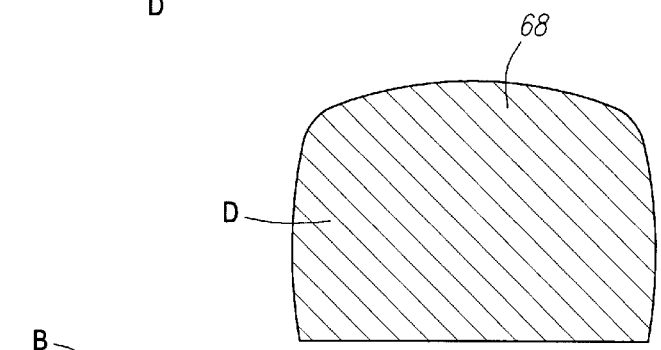
FIG. 13
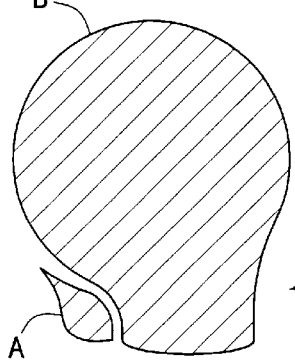
FIG. 14
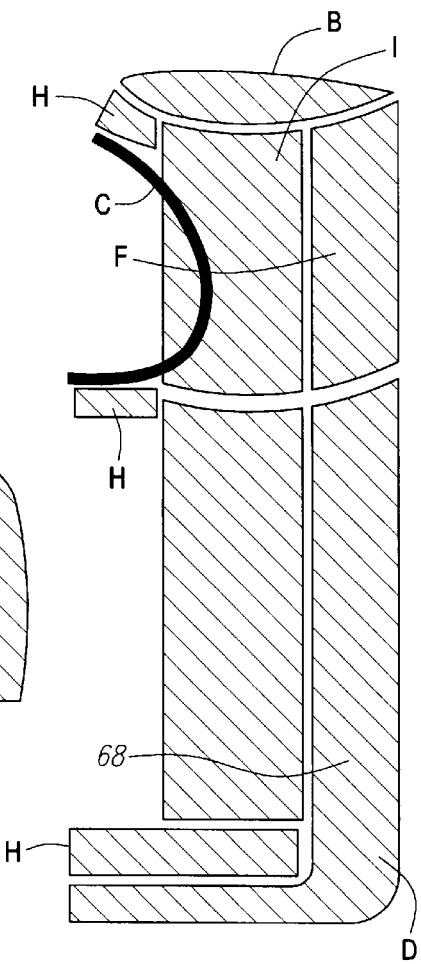
FIG. 15

GOLF CLUB TRAVEL BAG

BACKGROUND OF THE INVENTION

Field of the Invention

This invention relates to the field of golf, and more particularly to a travel bag for containing and transporting golf clubs within a golf club bag along with shoes and items of clothing.

A variety of golf club travel bags are known in the art. The travel bags range from thin nylon shells to hard cover cases. The thin nylon shell bags are desirable because they are light weight and easy to use. However, the thin nylon shell bags provide little, if any, protection for the golf clubs. The hard shell cases, on the other hand, provide a great deal of protection for the clubs. In addition, the hard shell cases are capable of carrying accessory items such as shoes. Although possessing many advantages, the hard shell cases are heavy and generally cumbersome to use and, thus, are less desirable.

Soft or padded shell cases have grown in popularity due to their light weight construction and their ability to provide greater protection to the golf clubs than the nylon shell bags. Like the hard shell cases, the soft shell cases are also capable of carrying other items such as shoes. However, to carry other items such as shoes, the soft shell cases usually utilize outwardly extending pockets that tend to snare during transport and, thus, increase the likelihood that the soft shell cases will tear.

One solution to the foregoing disadvantages is disclosed in U.S. Pat. No. 5,810,064 and assigned to the assignee of the present invention, the disclosure of which is incorporated herein by reference. Although that travel bag can contain a golf bag and clubs, as well as shoes and some possible clothing items, it is desirable to have a bag which can hold more clothing items, and one which is of reduced susceptibility to damage of the contents when thrown and jostled about as occurs in airport and airline baggage handling.

SUMMARY OF THE INVENTION

A golf club travel bag according to the present invention comprises an elongated bag of sufficient size to house golf clubs in a golf club bag, and has separate individual compartments for shoes and clothes and preferably includes a rigid "L-" shaped insert which provides a "hand truck" type design for facilitating rolling the travel bag with its contents, and further includes rigid inserts in most of the sides of the bag to further help protect the contents therein. The bottom of the bag includes a rigid cap with wheels, and the bag includes a handle at the opposite end, all to facilitate pulling or pushing the travel bag much like one moves a conventional "hand cart".

Accordingly, it is a principal object of the present invention to provide an improved golf club travel bag.

An important feature of the present invention is a golf club travel bag having a plurality of rigid inserts to help protect the contents of the bag.

Further objects and features of the present invention will become better understood through a consideration of the following description taken in conjunction with the drawings in which:

BRIEF DESCRIPTION OF DRAWINGS

These and other objects and features of the invention will become better understood through a consideration of the following description taken in conjunction with the drawings in which:

FIGS. 3 and 4 are opposite side views,

FIGS. 5 and 6 are respective top and bottom views,

FIG. 7 is a first open view illustrating a shoe compartment and a clothes compartment opened for access, FIG. 8 is a further open view with the front fully open to allow a golf bag with clubs therein to be placed within the travel bag, and FIGS. 9–15 are schematic illustrations of the locations of rigid panels within the bag, with FIG. 11 particularly illustrating a rigid "L-" panel to provide a "hand truck" feature.

DESCRIPTION OF THE PREFERRED EMBODIMENT

Figures 1, 2:
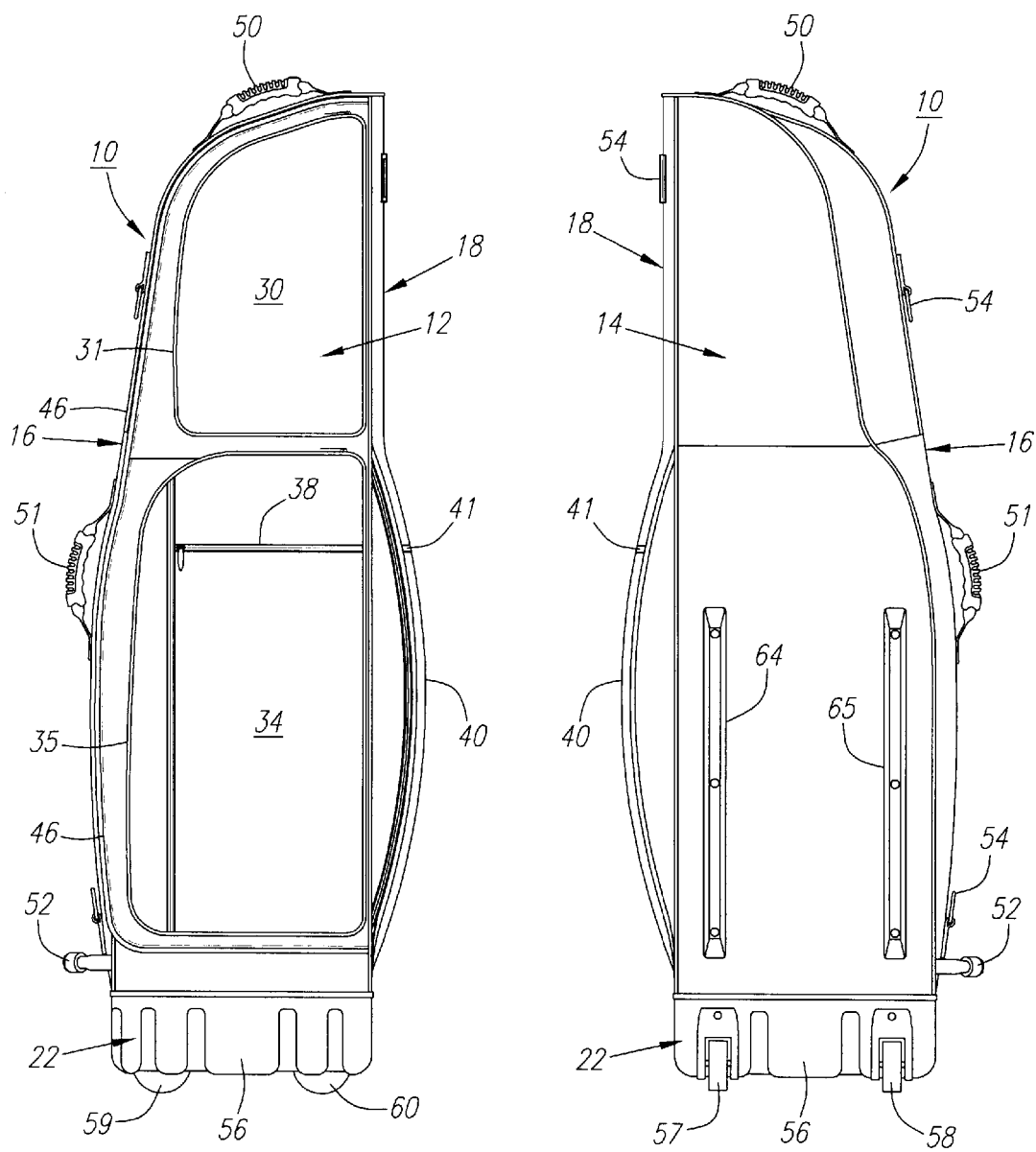
FIG. 1 is a front view of the travel bag.
FIG. 2 is a back view thereof.
Figure 9:
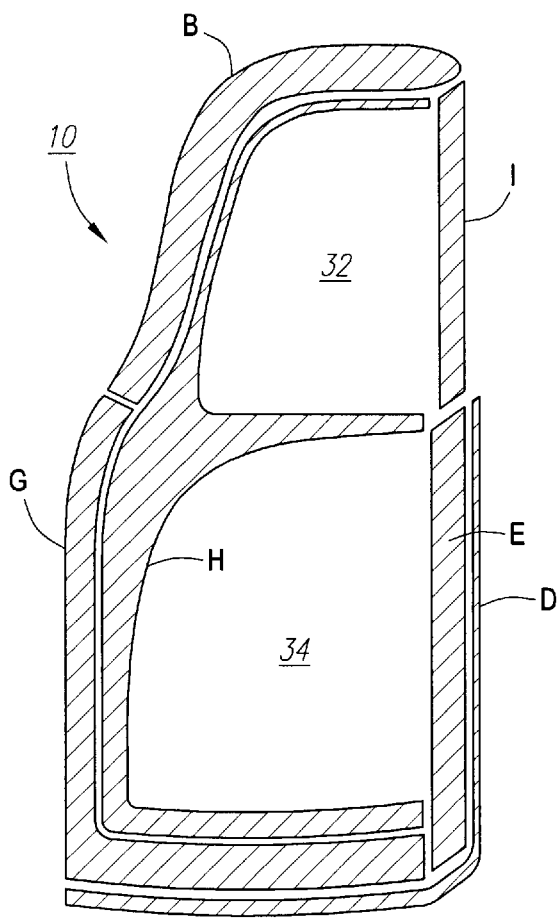
Figure 16:
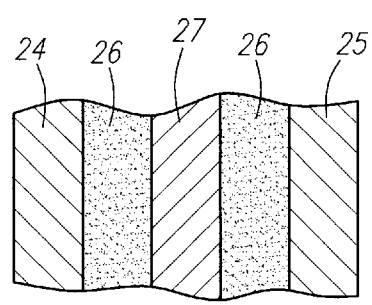
FIG. 16 is a cross-sectional view of a portion of the bag.
Figure 10:
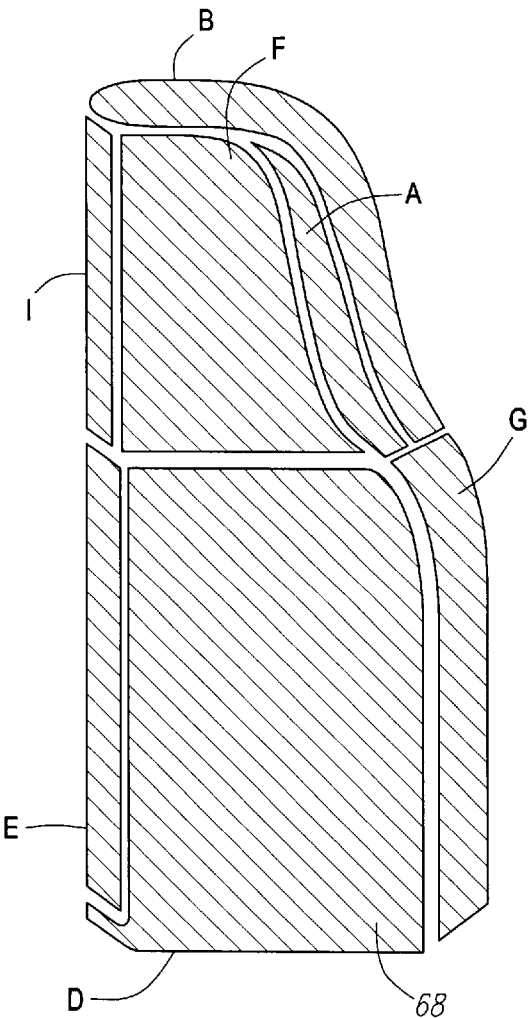

Turning now to the drawings, and first to FIGS. 1–6, a golf club travel bag 10 is illustrated and includes a front side 12 (FIG. 1), back side 14 (FIG. 2), right 16 (FIG. 3) and left 18 (FIG. 4) sides, and top 20 (FIG. 5) and bottom 22 (FIG. 6) sides. A majority of the travel bag is a laminated structure, and which will be discussed in further detail later, like shown in the cross-sectional view of FIG. 16 with an outer fabric layer 24 such as Tricot material, an innermost fabric layer 25 such as 1800 Ramie polyester, foam layers 26 typically about 6 mm dense foam laminated to the respective outer 24 and inner 25 layers, and an inner rigid layer 27 such as a suitable polypropylene plastic of approximately $\frac{1}{16}$–$\frac{1}{8}$ inch thick, but can be of any suitable thickness to provide the desired protection to the golf bag and clubs.

The front side 12 includes a cover 30 openable via a zipper 31 to form a shoe compartment 32 (FIG. 7), and a cover 34 openable via a zipper 35 to provide access to an internal clothes compartment 36 (FIG. 7) having suitable straps 37 to help retain clothes in place therein. The internal clothing or luggage compartment 36 obviates the problem with prior travel bags that have external compartments that tend to get snagged. The cover 34 also has a zipper compartment behind the outer surface of the cover 34 accessible via a zipper 38 within which smaller items can be placed. The left side 18 further has a rounded compartment 40 within which further clothing or other items can be placed by access through a zipper 41.

The entire front side 12 can be opened via a zipper 46 to provide access to a golf bag and clubs compartment 48 as seen in FIG. 8. A belt strap 49 is provided within compartment 48 to secure a golf bag (not shown) within the compartment 48.

The right side 16 of the travel bag 10 includes several handles, such as handles 50, 51 and 52. The bottom 22 comprises a rigid plastic cap 56 to which the sides 12, 14, 16 and 18 are suitably affixed. The cap 56 preferably includes pair of wheels 57, 58 via which the travel bag 10 can easily be rolled about, and a pair of feet 59 and 60 (note FIG. 6). Suitable hooks 54 can be provided on the right side 16 (FIG. 3) to allow a strap (not shown) to be attached to the hooks for facilitating carrying the travel bag 10. A name tag holder 55 (FIGS. 2 and 4) can be provided.

The back side 14 (FIG. 2) of the travel bag 10 includes a pair of skids 64 and 65 via which the travel bag can be slid, as into an airline luggage compartment. Of particular importance in facilitating moving the bag on the wheels 57 and 58 is the provisions of an "L" shaped rigid panel 68 (D) as seen in FIGS. 9, 10, 11, 13 and 15 within the lower back side 14 and bottom 22 of the travel bag 10. This rigid section 68 is a single "L" shaped plastic piece like 27 shown in FIG. 16, and along with the wheels 57 and 58 and the top handle 50 allow the travel bag to be rotated back onto the wheels 57 and 58 (that is, rotated counterclockwise as seen in FIG. 3 or clockwise as seen in FIG. 4) to allow the travel bag 10 to be moved much like one moves a conventional hand truck.

As noted earlier, most of the sides and top of the travel bag are protected by an internal laminated rigid panel sections 27. Such rigid panels are not needed on the front side 12 (note FIG. 9) because the shoe compartment 32 and clothing or luggage 36 compartment and the contents therein provide sufficient padding and protection for the golf clubs and golf bag (not shown) stored in the golf bag/clubs compartment 48. The panels are fixed stationary hard panels which are sandwiched between foam 26 and fabric 24,25 and are not removable. The specific locations and configurations of the panels 27 are identified by letters A through I in FIGS. 9–15. The panel C in FIGS. 11, 12, and 15 illustrates the back panel of the shoe pocket 32.

What is claimed is:

1. A golf club and golf bag travel carrying case comprising
an elongated case of laminated material comprising a front, back, right and left sides, top and bottom,
the bottom having a rigid cap with one or more wheels thereon for allowing the case to be rolled via the wheels,
the left side and bottom have laminated therein an L-shaped rigid panel to facilitate movement of the travel case in the fashion of a hand truck,
the back, right and top sides have laminated therein rigid panels for providing, along with the L-shaped panel, protection for golf clubs that can be stored within the case, and
the front side having first and second zipper covers for opening and providing access to internal respective shoe and clothing compartments, the front side having a further zipper closure for allowing the entire front section of the case to be opened to gain access to a golf bag and clubs compartment.

2. A case as in claim 1 wherein the top includes a handle, and
the case comprises a laminated structure of an outer fabric, foam layer, rigid panels in those areas in which the rigid panel exist, foam layer and inner fabric layer.

3. A case as in claim 1 wherein the back side includes skids for facilitating movement of the travel carrying case into and from a container such as an airline luggage compartment.

4. A case as in claim 1 wherein the front side has a further zipper closure area for providing access to items placed in a further compartment.

5. A case as in claim 1 wherein one of the right and left sides includes a further storage compartment accessible via a separate opening.

6. A case as in claim 1 wherein the clothing compartment includes retaining straps for facilitating retention of clothing therein.

7. A case as in claim 1 wherein the golf bag and clubs compartment includes a strap for retaining a golf bag therein.

8. A golf club and golf bag travel carrying case comprising
an elongated case of laminated material comprising a front, back, right and left sides, top and bottom,
the bottom having a rigid cap with one or more wheels thereon for allowing the case to be rolled via the wheels,
the front side having first and second zipper covers for opening and providing access to internal respective shoe and clothing compartments, the front side having a further zipper closure for allowing the entire front section of the case to be opened to gain access to a golf bag and clubs compartment, and
the top including a handle, and the left side and bottom having laminated therein an L-shaped rigid panel to facilitate movement of the travel case in the fashion of a hand truck, and wherein the back, right and top sides have laminated therein rigid panels for providing, along with the L-shaped panel protection for golf clubs that can be stored within the case.

9. A case as in claim 8 wherein the case comprises a laminated structure of an outer fabric, foam layer, rigid panels, foam layer and inner fabric layer.

10. A golf club and golf bag travel carrying case comprising
an elongated case of laminated material comprising a front, back, right and left sides, top and bottom, the laminated material comprising an outer fabric, foam layer, rigid panels in certain areas, foam layer and inner fabric layer,
the bottom having a rigid cap with one or more wheels thereon for allowing the case to be rolled via the wheels,
the front side having first and second zipper covers for opening and providing access to internal respective shoe and clothing compartments, the front side having a further zipper closure for allowing the entire front section of the case to be opened to gain access to a golf bag and clubs compartment,
the top including a handle,
the left side and bottom having laminated therein an L-shaped rigid panel to facilitate movement of the travel case in the fashion of a hand truck,
the rigid panels in certain areas comprising laminated rigid panels in the back, right and top sides for providing, along with the L-shaped panel, protection for golf clubs that can be stored within the case.

11. A golf club and gold bag travel carrying case comprising
an elongated case of laminated material comprising a front, back right and left sides, top and bottom,
the bottom having one or more wheels thereon for allowing the case to be rolled via the wheels,
the front side having first and second openable covers for opening and providing access to internal respective shoe and clothing compartments, the front having a further openable closure for allowing the entire front section of the case to be opened to gain access to a golf bag and clubs compartment,
the top including a handle, and the left side and bottom having laminated therein an L-shaped rigid panel to facilitate movement of the travel case in the fashion of a hand truck, and
the back, right and top sides having laminated therein rigid panels for providing, along with the L-shaped panel protection for golf clubs that can be stored within the case.

12. A case as in claim 11 comprising a laminated structure of an outer fabric, foam layer, rigid panels in those areas in which the rigid panel exists, foam layer and inner fabric layer.

13. A case as in claim 12 wherein the front side has a further zipper closure area for providing access to items placed in a further compartment.

* * * * *